Figure 16:
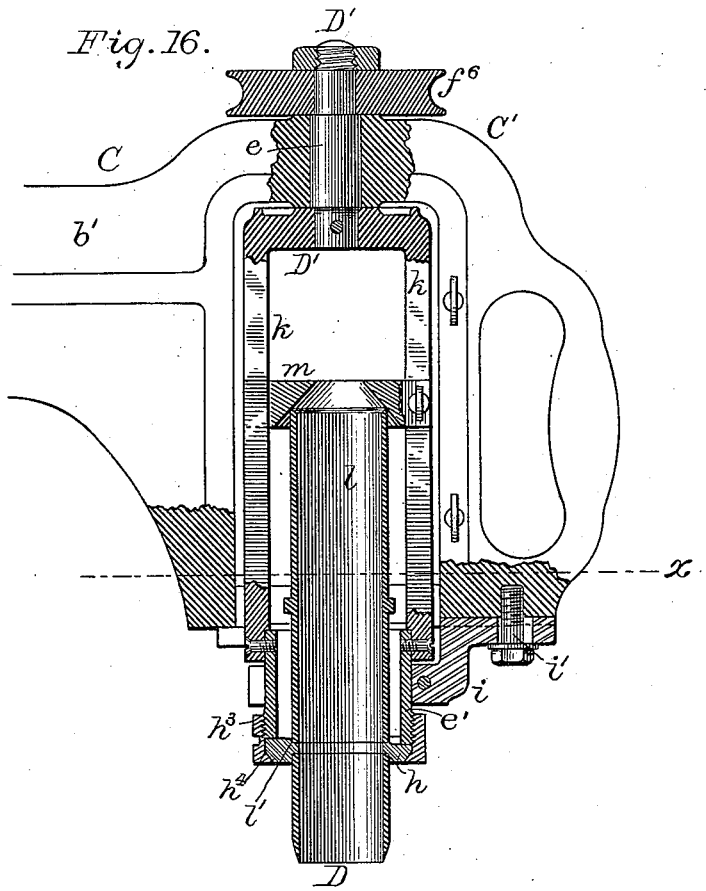

(No Model.) 6 Sheets—Sheet 1
D. H. CAMPBELL.
CLOTH CUTTING MACHINE.
No. 297,497. Patented Apr. 22, 1884.
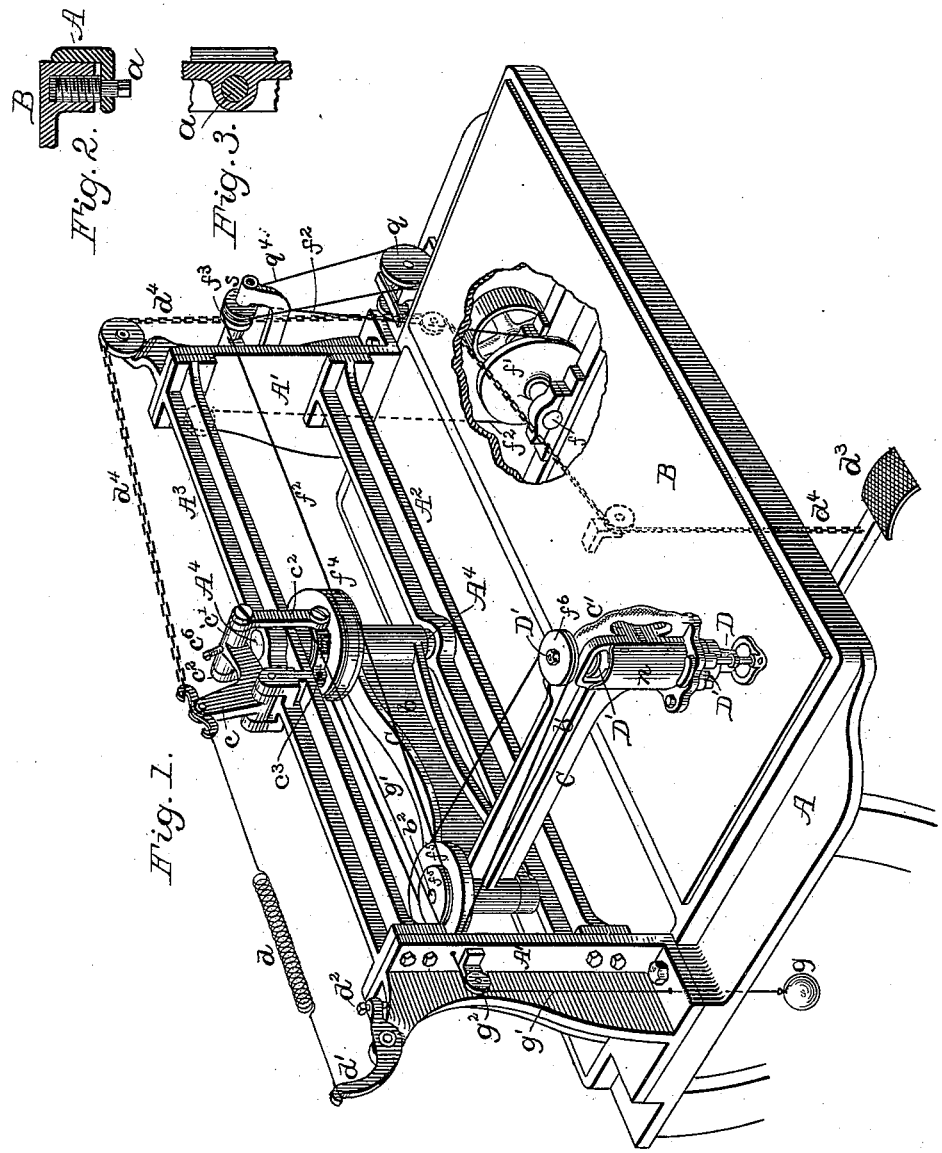
Attest:
Philip F. Larner,
Howell Bartle
Inventor:
Duncan H. Campbell.
By McWood
Attorney (No Model.) 6 Sheets—Sheet 2.
D. H. CAMPBELL.
CLOTH CUTTING MACHINE.
No. 297,497. Patented Apr. 22, 1884.
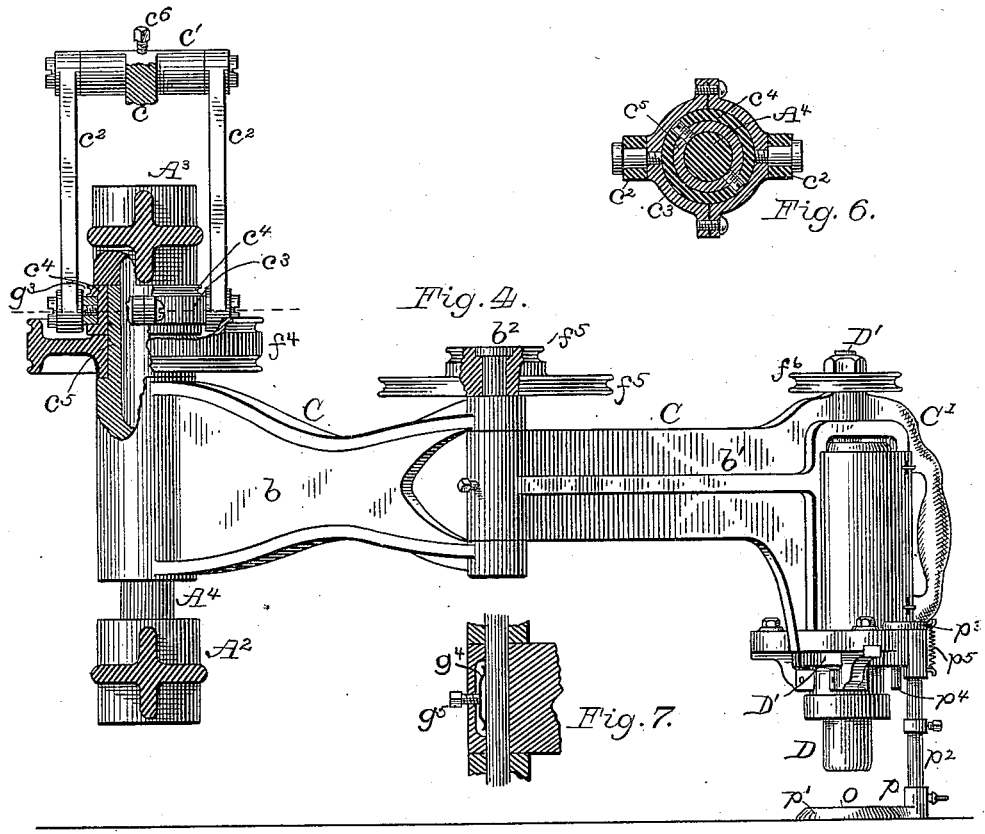
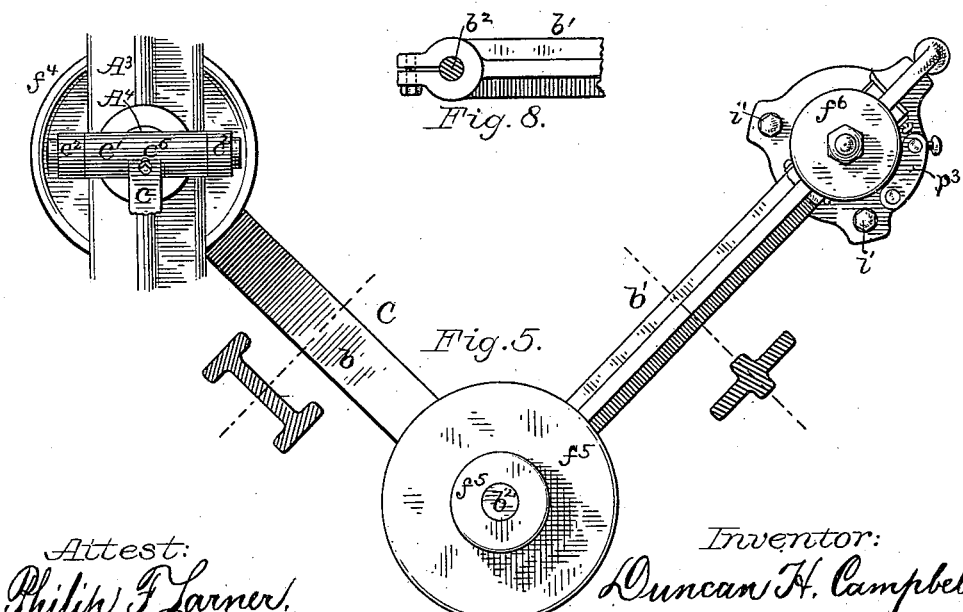
Attest:
Philip F. Larner
Howell Bartle
Inventor:
Duncan H. Campbell
By [signature]
Attorney (No Model.) 6 Sheets—Sheet 3.
D. H. CAMPBELL.
CLOTH CUTTING MACHINE.
No. 297,497. Patented Apr. 22, 1884.
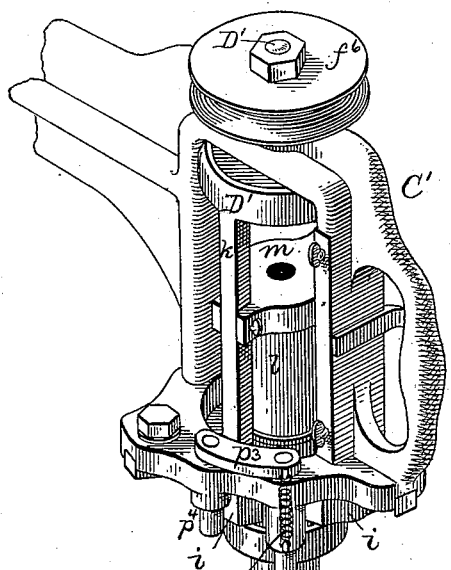
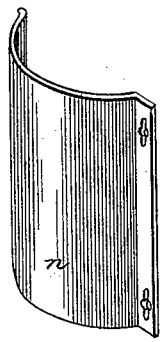
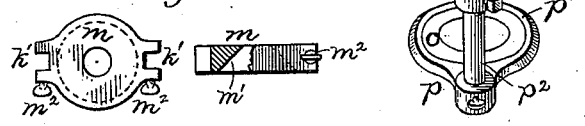
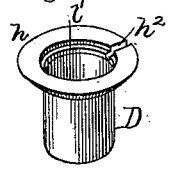
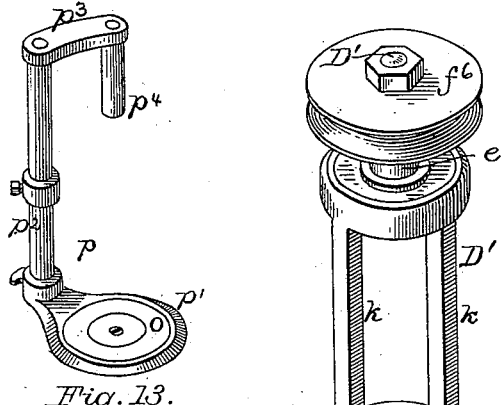
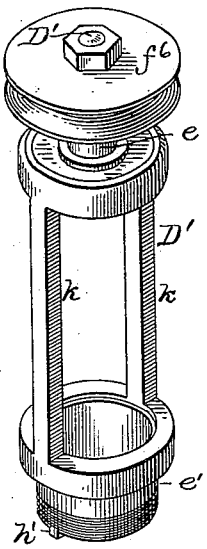
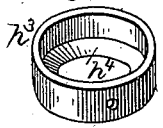
Attest:
Philip F. Larner
Howell Bartle
Inventor:
Duncan Campbell
By McLeod
Attorney (No Model.) 6 Sheets—Sheet 4.

D. H. CAMPBELL.
CLOTH CUTTING MACHINE.

No. 297,497. Patented Apr. 22, 1884.

Attest:
Philip F. Larner
Howell Bartle

Inventor:
Duncan H. Campbell,
By Wm. C. Mead
Attorney (No Model.) 6 Sheets—Sheet 5.

D. H. CAMPBELL.
CLOTH CUTTING MACHINE.

No. 297,497. Patented Apr. 22, 1884.

Attest:
Philip F. Larner
Howell Bartle

Inventor:
Duncan H. Campbell
By McM...
Attorney (No Model.) 6 Sheets—Sheet 6.

D. H. CAMPBELL.
CLOTH CUTTING MACHINE.

No. 297,497. Patented Apr. 22, 1884.

Attest:
Philip F. Larner
Howell Bartle

Inventor:
Duncan H. Campbell
By Wm. C. Mead
Attorney

UNITED STATES PATENT OFFICE.

DUNCAN H. CAMPBELL, OF PAWTUCKET, RHODE ISLAND, ASSIGNOR TO HENRY B. METCALF, OF SAME PLACE, AND WILLIAM McCLEERY, OF BOSTON, MASSACHUSETTS.

CLOTH-CUTTING MACHINE.

SPECIFICATION forming part of Letters Patent No. 297,497, dated April 22, 1884.

Application filed October 26, 1883. (No model.)

*To all whom it may concern:*

Be it known that I, DUNCAN H. CAMPBELL, residing in Pawtucket, in the county of Providence and State of Rhode Island, have invented a certain new and useful Cloth-Cutting Machine; and I do hereby declare that the following specification, taken in connection with the drawings furnished and forming a part of the same, is a clear, true, and complete description of the several features of my invention.

My cloth-cutting machine is exclusively adapted for service in connection with cutting cloth disks used in the manufacture of cloth-covered buttons. Various fabrics are employed for button-covering—among which are fine and costly silks, velvets, plushes, &c., both plain and woven—sometimes in patterns suitable for buttons of various sizes.

So far as my knowledge extends, the coverings for all round buttons have heretofore been cut by means of tubular punches, variously operated, but usually by hand, a blow being delivered by a mallet upon the head of the punch at each cut. The necessity for using a very sharp edged punch in order to obviate ragging or fraying the cloth disks is obvious, and a full through-cut is equally essential, and consequently such punches are liable to be speedily dulled by their incisions into the bed-block, on which the pile of fabric is supported, and it is well known that only a small number of thicknesses can be piled, if the cutting operation be thus conducted. It is also essential, in order to obviate undue waste of fabric in spoiling cloth covers in cutting, that only persons highly skilled in the use of the punch and mallet be employed.

The objects of my invention are to reduce to a minimum the loss in fabrics heretofore incident to this service, and to economize in the cost of cutting, by operating on a thicker pile of fabric than is possible with punches, and also by otherwise performing the service with greater rapidity, as well as enabling it to be well performed, by comparatively unskilled labor. To these ends I have, as I believe, for the first time, devised a machine capable of performing the service indicated; and I employ therein a rapidly-revolving tubular knife and a suitable bed for the pile of fabric, these two being so organized that one may be made to approach and recede from the other, and also so that without movement of the pile of fabric, independently of the bed on which it is supported, the knife may be applied at all points within the area of the pile. In its preferred form, the bed which supports the fabric is stationary, and the knife rotative in a truly vertical plane, or in a plane at right angles to the surface of the bed and of the pile of fabric thereon; but said knife is also capable of being moved vertically, and also in all directions laterally, within the area of the cloth-bed. It will, however, be within certain portions of my invention if the knife be revolved in an unvariable vertical plane, and the bed be movable in all directions in a plane at right angles to the axis of the knife, and the knife may be moved toward and from the bed, or the bed moved toward and from the knife. It is well known that cloth covers can only be handled with great risk of injury, because of the obvious liability of the fabric to fray or unravel at four diametrically-opposite points; and in order to obviate said loss incident to handling, I have combined with my revolving tubular knife means by which a cloth-disk holder can be placed above the knife for receiving the disks directly therefrom. These cloth-disk-holders are such as were devised by me for use in connection with automatic button-making machinery, also devised by me, for which applications for Letters Patent have heretofore been filed by me; but they can also be profitably employed in connection with hand-fed machines, the disks being in that case forced out a few at a time, leaving those in the holder well protected against injury. I have also organized in my machine a grinding apparatus, whereby the tubular knife may be ground without detaching it from the machine, thus not only enabling the knife to be ground with the greatest accuracy, but also enabling it to be done with rapidity and by the operator of the machine, with the expenditure of but little, if any, more time than in removing the knife from its chuck.

To more particularly set forth my invention, I will refer to the accompanying six sheets of drawings, and after a full description of the mechanism thereby illustrated, the features deemed novel will be specified in the several claims hereunto annexed.

Figure 17:
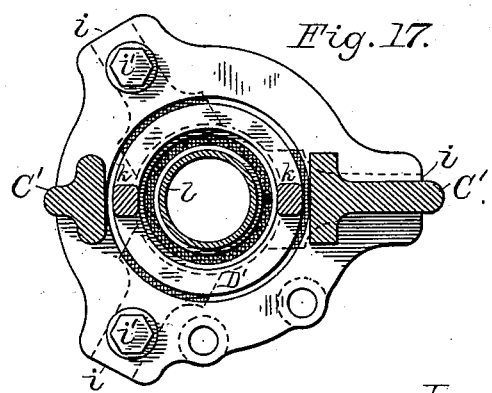
Figure 18:
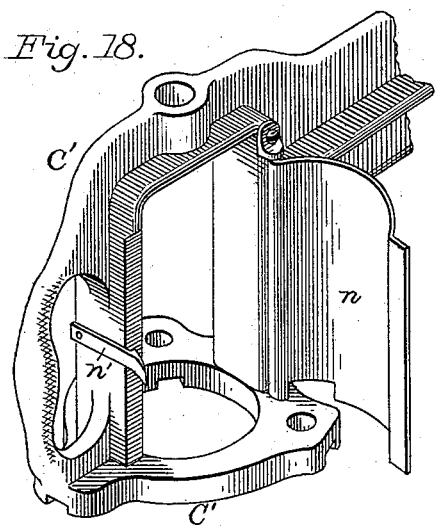
Figure 20:
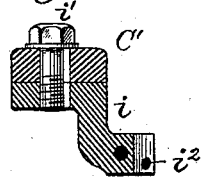
Figure 19:
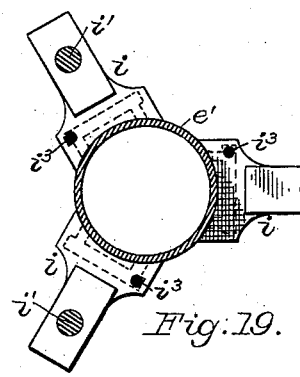
Figure 21:
Figure 22:
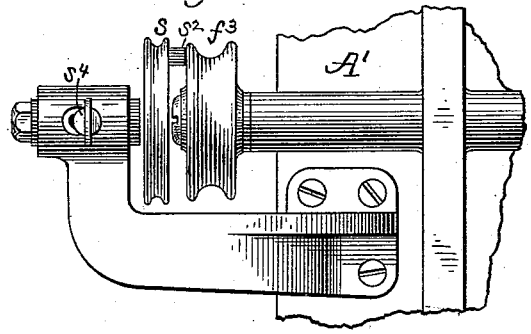
Figure 23:
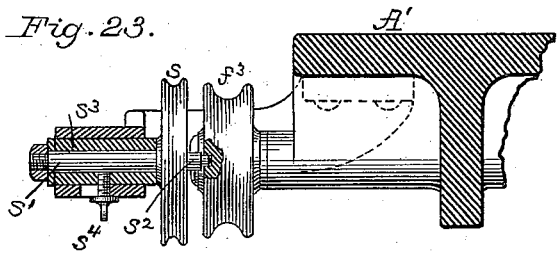
Figure 24:
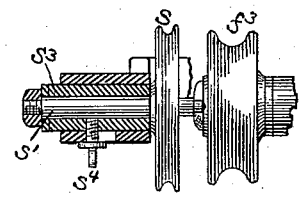
Figure 25:
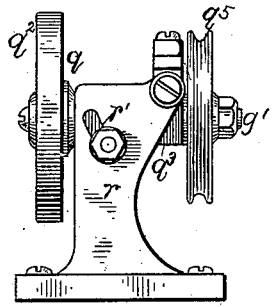
Figure 26:
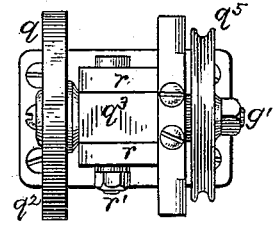
Figure 27:
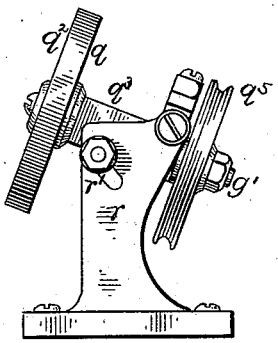

Figure 1, Sheet 1, is a front perspective view of a machine embodying the several features of my invention. Figs. 2 and 3 are sectional views, indicating the adjusting-screws by which the cloth-bed is properly set in a plane exactly at right angles to the axis of the revolving knife. Fig. 4, Sheet 2, is an enlarged side view of the knife-arm of the machine detached, and a portion of the frame of the machine shown in section. Fig. 5 is a top view of the parts shown in Fig. 4, including portions of the knife-arm shown in section. Figs. 6, 7, and 8 are detached sectional views, illustrating desirable details in construction, which will hereinafter be particularly described. Fig. 9, Sheet 3, is an enlarged view of the head of the knife-arm detached. Fig. 10 is a detached view of the knife axis or chuck constructed to receive a disk-holder. Fig. 11 is a detached view of a shield for protecting the hand of the operator from contact with the knife-axis and disk-holding device while rotating. Fig. 12, in two views, respectively in section and in top view, illustrates a head-plate for confining a disk-holder in position above the revolving knife. Fig. 13 is a view of a tubular knife-pad, its plate, and the arm by which it is suspended beneath the knife, for supporting the fabric, and affording a proper surface with which the edge of the knife can engage after cutting through the fabric. Fig. 14 is a view of the tubular knife and a notched collar to which it is firmly attached. Fig. 15 is a view of a clamping-ring by which the knife is secured to its axis or chuck. Fig. 16, Sheet 4, is a vertical sectional view of the head of the knife-arm, the knife, its axis or chuck, and the disk-holder, all as in position for service. Fig. 17 is a horizontal section of the parts shown in Fig. 16 on line $x$. Fig. 18, Sheet 5, is a view of the knife-head arm, with the knife, its axis or chuck, and disk-holder removed. Fig. 19 is a plan view of adjustable sectional bearings for the lower end of the knife axis or chuck. Fig. 20 is a sectional view of one of the bearing-sections and the portion of the knife-arm head to which it is adjustably secured. Fig. 21 is a face view of one of the bearing-sections, illustrating the varied vertical position of the lubricating-ducts therein. Figs. 22, 23, and 24, Sheet 6, illustrate the intermediate belt-pulleys and clutch by which the grinding-wheel is driven. Figs. 25 to 27, Sheet 6, illustrate knife-grinding apparatus arranged within range of the head of the knife-arm, whereby the tubular knife may be readily ground without detaching it from the machine.

The frame of the machine embodies a suitable bed-plate, A, which may be provided with legs, as indicated; or it can be arranged to be mounted upon a bench. Upon the bed-plate a cloth-bed, B, is mounted; and for obtaining the best results, especially without a knife-pad, the bed should always be level, and I therefore mount it upon a suitable number of adjusting-screws, $a$, as indicated in Figs. 2 and 3, Sheet 1. Other well-known leveling mechanism can obviously be employed. The cloth-bed may be composed of metal, if a knife-pad be used; but if the knife is permitted to take a cutting-bearing thereon, it should be faced with wood, leather, or other comparatively soft and yielding material. At each end of the bed-plate there is a vertical standard, A', and these support between them two horizontal parallel bars, $A^2$ and $A^3$.

The knife-arm C is in two lengths, $b$ and $b'$, elbow-jointed on a spindle, $b^2$, and the inner portion, $b$, at its butt is sleeved upon a vertical spindle or rod, $A^4$, which is fixedly mounted in seats provided therefor centrally in the bars $A^2$ $A^3$. The knife-arm is arranged to slide vertically on the spindle $A^4$, and it is suspended from a bell-crank lever, $c$, by way of a cross-bar, $c'$, and links $c^2$, which are hinged to a sectional collar, $c^3$, occupying an annular recess in the sleeve $c^4$, which is firmly secured to an upwardly-projecting hub, $c^5$, integral with the portion $b$ of the knife-arm, as clearly indicated in Figs. 1, Sheet 1, and 4, 5, and 6, Sheet 2. The bell-crank lever $c$ is normally so held as to maintain the knife-arm in its most elevated position, as seen in Figs. 1 and 4, by means of the retractile spiral spring $d$, connected to a bracket-lever, $d'$, which has an adjusting-screw, $d^2$, by which the tension of the spring may be graduated. The knife-arm is lowered upon the rod or spindle $A^4$ by depressing the treadle $d^3$, to which is connected the chain $d^4$, which, passing over suitable pulleys, is attached to the lever $c$, so that by overcoming the power of the spring $d$, by pressure on the treadle, the knife-arm is lowered, and it is lifted by said spring when the treadle is released.

As thus far described, it will be obvious that the head C' of the knife-arm may not only be raised and lowered, but also located above any and all portions of the cloth-bed, said arm-head being provided with a handle, as shown, to facilitate its said movements by the operator; and for positively limiting and graduating the downward movement of the knife-head toward the cloth-bed, the bell-crank lever $c$ is provided with an adjusting-screw, $c^6$, which abuts at its lower end against the coincident upper surface of the frame-bar $A^3$.

The revolving tubular knife D has an axis or chuck, D', provided with upper and lower journals, $e$ and $e'$, which have bearings in the arm-head C', and motion is imparted to the knife by means of belts and grooved pulleys, as follows: The main shaft $f$ beneath the machine has a grooved pulley, $f'$, from which a round belt, $f^2$, passes over two vertical loose pulleys, $f^3$, (of which one only is shown in Fig. 1,) and around a horizontal loose pulley, $f^4$, on the hub $c^5$ of the portion $b$ of the knife-arm C. Said pulley $f^4$ is belted in like manner with the smallest of the grooved pulleys $f^5$, loosely mounted on the elbow-spindle $b^2$ of the knife-arm, and in like manner the largest pulley $f^5$ is belted to the grooved pulley $f^6$, which is secured on the axis or driver D' of the knife D. The draft on the belts has a tendency to swing the knife-arm in a corresponding direction, and therefore I apply counteracting drags to operate against the belts—as, for instance, at the butt of the arm, as seen in Fig. 1, this swinging tendency is overcome by means of a weight, $g$, attached to a cord, $g'$, passing over a loose pulley, $g^2$, and secured at its opposite end to one side of the collar $c^4$, before described as secured to the hub of the arm, said collar being grooved, as at $g^3$, for enabling said cord to partially encircle it. The swinging tendency of the outer portion, $b'$, of the knife-arm is overcome by means of a friction-spring, $g^4$, and screw $g^5$ at the elbow-joint, Figs. 4 and 7, so arranged that the spring bears forcibly against the elbow-spindle $b^2$, which is non-rotatively mounted in the portion $b$ of the arm. In lieu of the spring, the sleeve end of the portion $b'$ of the arm may be slotted, and provided with a clamp-screw for causing the sleeve to pinch upon and frictionally engage with the elbow-spindle $b^2$, as illustrated in Fig. 8.

The knife axis or chuck D' is shown detached in Fig. 10, Sheet 3. At its lower end it is tubular in form, externally screw-threaded, and provided with a stud, $h'$, which occupies a slot, $h^2$, in the collar $h$ of the tubular knife, Fig. 14, when the internally-threaded sleeve $h^3$, Fig. 15, is placed over the knife and turned up tightly, the interior annular beveled surface, $h^4$, in said sleeve serving to accurately center the knife with relation to the center of the chuck, and also enabling several different sizes of collars and knives to be used in the same chuck. In order that the chuck may be accurately centered and wear compensated, I have provided for the radial adjustment of the lower bearings, $i$, which are arranged radially, are connected by dovetail slides to the arm-head C', and are provided with slot-and-bolt connections, as at $i'$, as clearly indicated in Figs. 16 to 21, inclusive, Sheets 4 and 5. The upper journal, $e$, of the axis or chuck D' is solid and cylindrical, and has its bearing in the upper part of the arm-head C', as clearly shown in Fig. 16, Sheet 4. The chuck, between its upper and lower bearings, is skeletonized, the tubular lower portion and the solid upper portion thereof being connected by a disk near the top, and two parallel ribs or bars, $k$, as clearly indicated in Figs. 9, 10, and 16. This construction of the chuck enables a tubular disk-holder, $l$, Fig. 16, to be readily introduced and withdrawn. The lower end of the disk-holder occupies an annular recess, $l'$, in the knife-collar $h$, so as to cause the interior surface of the holder to be truly coincident with the interior surface of the knife, and said holder is axially centered concentrically with the knife, and properly secured by means of the clamping-collar $m$, Fig. 12, provided with an annular beveled seat, $m'$, and with slotted ears $k'$, which are fitted to slide upon the ribs $k$ of the chuck, and are secured in position by the clamp-screws $m^2$.

The rapid rotation of the chuck renders it important that it be housed to obviate liability of contact with the hands of the attendant, and therefore I have provided the shields $n$, applied to opposite sides of the arm-head; and one or both of said shields should be hinged to afford ready access to the interior of the chuck. Figs. 1 and 4 illustrate the shields in their closed position. Fig. 11 shows one of them detached, and Fig. 18 shows the other opened outwardly on its hinges, a spring-latch, $n'$, serving to confine it when closed.

The knife for good results should be revolved at very high speed, and the lower journal being quite large it is important to specially provide for lubrication of its bearings $i$; and therefore I construct them with oil-reservoirs and provide each with two delivery-ducts, $i^2$, which, as seen in Fig. 21, Sheet 5, occupy different planes, thereby assuredly delivering oil to the entire surface of the bearing. The oil-reservoirs may be provided with a fibrous absorbent, and they are conveniently charged by way of oil-ducts entering from the upper surface, as at $i^3$, Fig. 19.

It is obviously important that the knife at the termination of each cut should engage with and cut into some material which will not materially dull the knife or develop so much frictional heat as to impair its temper; and while it is possible in this connection to have a wooden or leather surfaced cloth-bed, it is far preferable to employ a special knife-pad, as devised by me and shown at $o$, Figs. 1, 4, 9, and 13. The knife-pad $o$ is composed of cork, leather, or other similarly-suitable material, and it is located in a pad-holder, $p$, composed of a horizontal socketed plate, $p'$, a vertical stem, $p^2$, a yoke, $p^3$, and a pendent stem, $p^4$. The stems $p^2$ and $p^4$ are fitted to vertical holes in the flange at the lower end of the arm-head C', as clearly shown in Fig. 9, Sheet 3. The pendent stem $p^4$ and the yoke $p^3$ serve to always maintain the pad beneath the knife, and a retractile spiral spring, $p^5$, serves to normally maintain said pad at its lowest position and still permits the knife and arm to descend when the pad-holder is resting upon the cloth-bed; and when it is desirable to swing the pad-holder around from beneath the knife, as when the latter is to be ground, the pad-plate may be loosened on its stem and swung around free from the knife.

The mode of working the machine should be obvious from the description of the several parts thereof; but I will state that with the machine as shown, and a cloth-disk holder having been placed within the knife-chuck, and a pile of fabric placed evenly on the cloth-bed, and the machine in motion, the attendant grasps the handle of the knife-arm, moves the knife over the fabric at the point where a cut is to be made, and then depresses the treadle, thereby lowering the knife, which cleanly cuts its way through the pile and into the knife-pad, which, as it moves laterally with the knife and rests upon the cloth-bed, is always interposed between the fabric and the bed exactly beneath the knife. The elbow-joint of the knife-arm and the spindle $b^2$ at the butt of the arm enable the knife to operate longitudinally and to be moved transversely over all portions of the pile of fabric, and therefore the fabric can be cut with the strictest economy in matter of time and with a minimum of waste.

The knife-edge should always be kept as sharp as possible, and I have therefore devised a grinding-wheel which is so attached to the machine that the knife while in the chuck cannot only be sharpened, but so ground that its cutting-edge will always be truly concentric with the axis of the chuck. As seen in Fig. 1, and in the figures on Sheet 6, the grinding-wheel $q$ is mounted upon a swiveled arbor, $q'$, so that the flat grinding-face $q^2$ of the wheel can be set at any desired angle, as seen in Fig. 27, for grinding the proper bevel on the tubular knife while revolving with its chuck, which, because of the jointed arm, enables the knife to be readily swung around in contact with the grinding-wheel into position, as indicated in dotted lines in Fig. 27. The arbor $q'$ of the grinding-wheel is mounted in a pivotal box, $q^3$, which can be secured at various angles in the bracket $r$ by means of a slot and bolt, $r'$. Power for driving the grinding-wheel is derived by a belt, $q^4$, from a grooved pulley, $s$, on a counter-shaft, $s'$, which is clutched to the pulley $f^3$, before described, said belt $q^4$ engaging with the pulley $q^5$ on the grinding-wheel arbor. The side face of the pulley $f^3$ is provided with a hole, and the coincident face of the grooved pulley $s$ is provided with a clutch-pin, $s^2$, which occupies said hole when the grinding-wheel is to be used; but when grinding is not desired the pulley $s$ is moved longitudinally in its bearings, so as to disengage the clutch-pin, as shown in Figs. 22, 23, and 24. The counter-shaft $s'$ is mounted in a sleeve-bearing, $s^3$, which is movable longitudinally in the bracket-arm, and it can be firmly set, with the clutch in or out of service, by means of the slot and set-screw $s^4$. The construction and arrangement of the parts which constitute the grinding apparatus may be largely varied without materially affecting the results, so long as the knife while revolving can be placed in proper relations to the grinding-wheel for enabling the grinding operation to be so performed that the knife will be suitable for the peculiar service desired.

It will be seen that the outer portion of the jointed arm can be readily detached by the removal of the pintle $b^2$, thus enabling a different arm-head to be employed for supporting an arbor or chuck for carrying a smoothing-iron, as will be set forth in a separate application for Letters Patent to be filed by me. It is, however, obvious that a flat disk-shaped smoothing-iron might be applied to the chuck shown, and if the iron were hollow and provided with a gas-burner, it is also obvious that the latter could be supplied with gas by way of a pipe entering through the upper end of the chuck, which in that case would be hollow instead of solid, as shown.

I am aware that many cloth-cutting machines have heretofore been devised which have embodied jointed arms of various kinds, and flat circular knives having peripheral cutting-edges; but, so far as I know, I am the first to devise a tubular cloth-cutting knife, and the first to employ the same in combination with a knife-head and a bed so organized that an entire pile of textile fabric on the bed can be cut into disks. I am, however, aware that tubular knives have been employed in cork-cutting machines in connection with a movable clamping-bed, on which a strip of cork-stock is confined, and which is moved so that the knife can successively operate in making a row of cuts lengthwise of the strip of cork-stock.

Having thus described my invention, I claim as new and desire to secure by Letters Patent—

1. The combination, substantially as hereinbefore described, of the revolving tubular cloth-knife, the cloth-bed, and means, substantially as described, for enabling the knife to be located while revolving above any and all portions of the cloth-bed and a pile of fabric thereon, and to cut through said pile at any and all parts thereof, as and for the purposes specified.

2. The combination, substantially as hereinbefore described, of the tubular cloth-knife, its vertically-movable jointed arm, and the cloth-bed.

3. The combination, substantially as hereinbefore described, of the cloth-bed and its leveling mechanism, and a revolving tubular knife, which can be moved toward and away from the bed only in the axial line of the knife, as set forth.

4. The combination, substantially as hereinbefore described, of a revolving tubular cloth-cutting knife, the cloth-bed, a knife-pad supported by said bed, but movable laterally with the knife, and means, substantially as described, for enabling the knife while revolving to cut its way through a pile of fabric interposed between the pad and knife, as set forth.

5. The combination, substantially as hereinbefore described, of a revolving tubular cloth-cutting knife, and a knife axis or chuck which is skeletonized for the reception of a removable disk-holder for receiving the cloth disks which are cut by said knife, as set forth.

6. The skeletonized knife-chuck, in combination with the clamping-collar, substantially as described, whereby a tubular disk-holder is secured in position above and concentric with a tubular knife mounted on said chuck, as set forth.

7. The combination of the chuck, the jointed arm, the belt-pulleys at the butt of the arm, its central joint, and on the chuck, their belts, and counteracting drags, which overcome the tendency of the arm to swing in the direction of the draft on the belts, substantially as described.

8. The combination, substantially as hereinbefore described, of a hollow revolving chuck, the jointed arm, its lifting-spring, the depressing-treadle, and the cloth-bed.

9. The combination, with a tubular knife and its chuck, and a jointed arm on which the knife-chuck is mounted, of a grinding-wheel located within the sweep of the arm, substantially as described, whereby the knife may be ground while revolving on its chuck.

DUNCAN H. CAMPBELL.

Witnesses:
LAWRENCE A. LOCKWOOD,
JOSEPH COFFEY.